(No Model.) 2 Sheets—Sheet 1.
F. BILLING & W. E. PARTRIDGE.
FRAME JOINT.
No. 587,695. Patented Aug. 10, 1897.
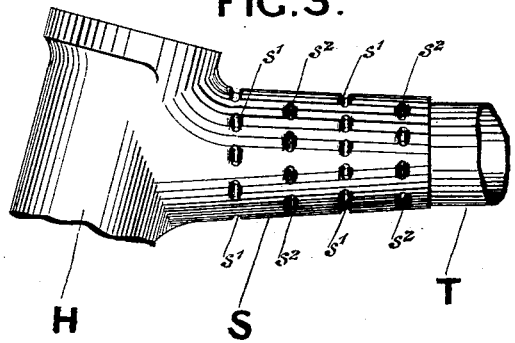
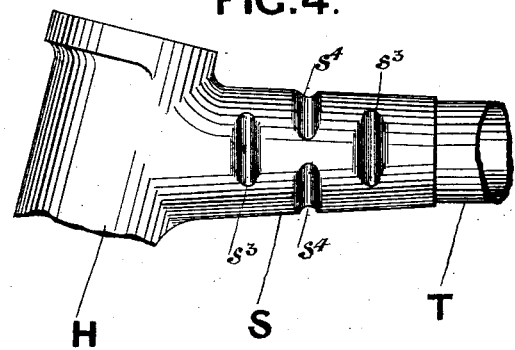
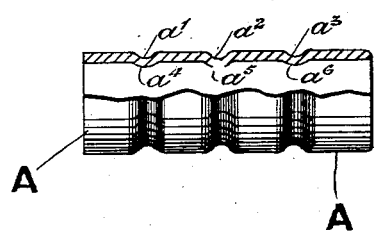
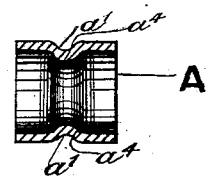
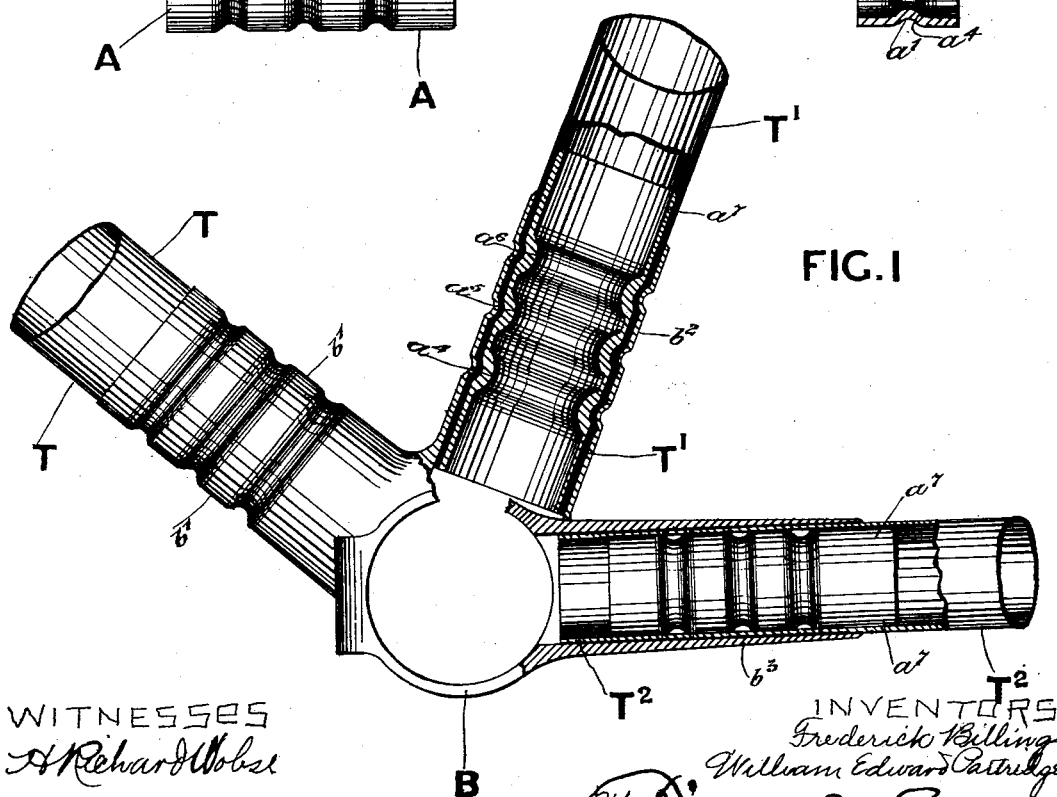

(No Model.) 2 Sheets—Sheet 2.

F. BILLING & W. E. PARTRIDGE.
FRAME JOINT.

No. 587,695. Patented Aug. 10, 1897.

WITNESSES

INVENTORS
Frederick Billing
William Edward Partridge
by Richardson
Attys

UNITED STATES PATENT OFFICE.

FREDERICK BILLING AND WILLIAM EDWARD PARTRIDGE, OF BIRMINGHAM, ENGLAND.

FRAME-JOINT.

SPECIFICATION forming part of Letters Patent No. 587,695, dated August 10, 1897.

Application filed December 11, 1896. Serial No. 615,393. (No model.) Patented in England October 28, 1896, No. 24,013.

*To all whom it may concern:*

Be it known that we, FREDERICK BILLING, manufacturer, residing at Livery Street, and WILLIAM EDWARD PARTRIDGE, traveler, residing at 74 Grange Road, Small Heath, Birmingham, in the county of Warwick, England, subjects of the Queen of Great Britain, have invented certain new and useful Improvements in the Means for Joining Tubing to Sockets or to other Lengths of Tubing, which is specially applicable to the junctions of cycle and motor frames, of which the following is a specification.

The invention has been patented in England, No. 24,013, October 28, 1896.

Our invention has for its object improvements in the means for joining tubing to sockets or to other lengths of tubing, which is specially applicable to the junctions of cycle and motor frames and which avoids the necessity for brazing or soldering the joints. By this means we also avoid a good deal of trimming and filing up, and joints so made are stronger, as the soldering very often leaves the tube brittle at or near the junction, and many accidents have occurred through this cause.

In order that our invention may be clearly understood and more easily carried into practical effect, we have appended hereunto drawings upon which we have illustrated sufficient examples as applied to a cycle-frame to enable the invention to be applied to the various circumstances and conditions met with in practice.

Figure 7:
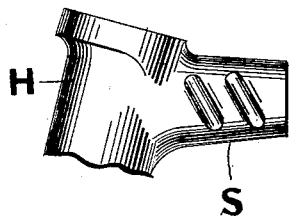
Figure 8:
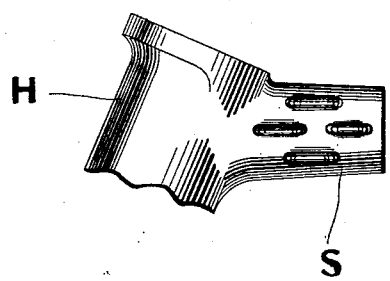
Figure 9:
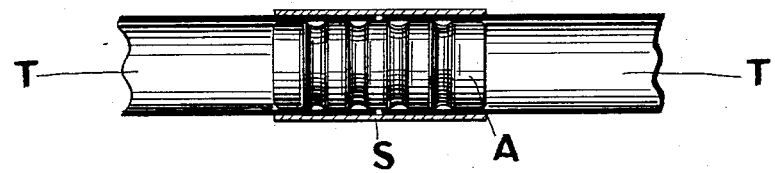
Figure 5:
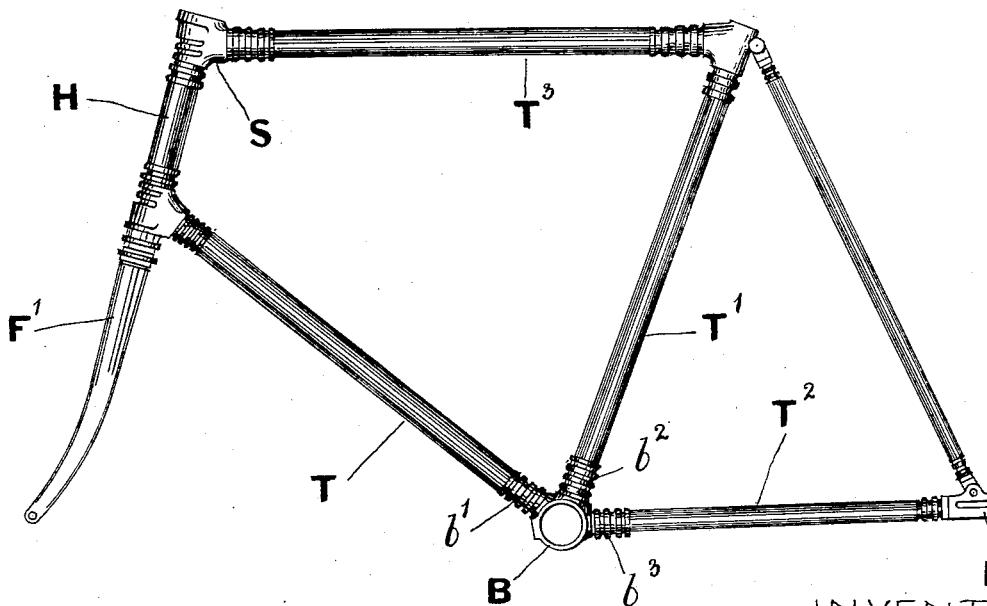

Figure 1 shows the main bracket of a bicycle B, with the tubes T, T', and T², which form members of the frame, shown attached to the same according to our invention. Fig. 2 shows what we term our "anvil" or "stiffening" liner, which forms a very important portion of our invention. Fig. 3 shows a tube T attached to the socket S of the head H according to a modification of our invention. Fig. 4 shows another modification of our mode of attachment. Fig. 5 is a general elevation of a bicycle-frame with the whole of the tubes or members attached according to our invention. Figs. 6, 7, and 8 are modifications of the foregoing, Fig. 6 being a sectional view of a short anvil, Fig. 7 a side view of the part of a head-socket in which the indentations are inclined, and Fig. 8 a similar view in which the indentations extend longitudinally of the joint; and Fig. 9 shows our device used for joining the abutting ends of two tubes.

Our invention consists in forming joints in such a manner that very light tubing or hollow members can be securely joined into the junction-sockets, so that no brazing is required and yet the two are locked firmly together, and this is accomplished without injury to the tube or member. By this means the necessity for filing and cleaning off the joints is in a very great measure avoided, and a large amount of the cost and trouble and plant in building frames is avoided, besides the work being accomplished more expeditiously.

The main bracket B, Fig. 1 on the drawings, has three tubes T, T', and T² brought into position in the sockets $b'$ $b^2$ $b^3$. In making the joints we prepare first what we term an "anvil" or "strengthening" liner A, which has one, two, three, or more hollows or depressions $a'$ $a^2$ $a^3$.

The anvil or strengthening liner is shown at Fig. 1, partly in section and partly in elevation, and from the section it will be seen that the parts $a^4$ $a^5$ $a^6$ under the depressions are a little thicker than the body and ends of the liner, as we prefer the ends to taper off and to be slightly rounded at the ends, especially externally and at the outer or farthest end from the socket. This anvil or liner-piece is put into the end of the tubes T, T', and T² either flush, as seen in T', or short of the end, as seen in T², and the tube may be indented into the depressions $a'$, &c., first, which we have found convenient; but otherwise they may be simply put in tightly, or fairly so. Whether the depressions are made or partly made first or not in the tube, the tube T and liner A are put together into the socket, as seen at T', Fig. 1. Pressure is then applied to the socket over the depressions until both the socket and tube are forced together, as seen in section at T', Fig. 1, when the tube is securely locked between the anvil-liner A and the socket.

We prefer the liner to extend into the tube beyond the socket a little, as seen at $a^7$; but it may be shorter than the tube or not at the inner end. It will also be understood that a very similar effect will be produced if only separate rings are used, as seen at Fig. 6, as they would practically serve the purpose in some cases, but we prefer the long liner and long sockets. The depressions $a'$, &c., in A may be made one at each end only or any number of them to an accurate pitch, and the tool for making the depressions in the socket may be either a press to do them all at once or separately or a jaw with rollers may be used, such as for cutting pipes, as we do not confine ourselves to the mode of making the depressions. For cheapness, however, we find that common cast-iron is suitable for the anvil-liners A, though steel may be used, or malleable cast-iron or ordinary wrought-iron, though we prefer cast-iron, because it resists compression effectively and is cheap.

The indentations in the socket may sometimes not extend continuously, but may be as seen at Figs. 3, 7, and 8, where the indentations $s'$ do not come opposite the indentations $s^2$. The same remark applies to Fig. 4, except that the indentations $s^3$ and $s^4$ continue around each about one-third or more of the circle.

Fig. 5 is a diagram view of a frame put together according to our invention in all its junctions, except that the fork end pieces being solid the tube, whether D shape or round, may fit over the fork end piece F, and where this is the case the solid end may have the depressions in it and takes the place of our anvil-liner A; but even then we should prefer to use an external ferrule-piece to strengthen the tube, though where there is but little strain it may be dispensed with. It is needless to remark that the handle-bar and front forks F' may be treated in like manner as explained for the other portions. It will also be evident that two lengths of light tubing may be joined together on the same principle, as seen at Fig. 9, where the outside socket or ferrule S is used in conjunction with the anvil-liner A. Should there be any liability for the tube to turn when the depressions are continuous, it is only necessary to make a few indentations with a tool or center-punch in the depressions. The depressions may therefore be made in almost any direction so long as the anvil-liner agrees; but we prefer the ring depressions, as shown at Fig. 2 and in the frame Fig. 5.

Having now particularly described and ascertained the nature of our said invention and in what manner the same is to be performed, we declare that what we claim is—

1. In combination in a bicycle or like frame, the frame-bar, the socket-piece and the connection between them comprising the anvil-piece having indentations with parts of the socket-piece and bar pressed into the same.

2. In combination in a bicycle or like frame, the tubular frame parts and the connection between them comprising the anvil having indentations with the material of the frame parts pressed into the same, substantially as described.

3. In combination in a bicycle or like frame, the socket, the frame-bar, the anvil having indentations and arranged within the frame-bar and the socket receiving the end of the frame-bar, the wall of the socket and frame-bar being pressed into the indentations of the anvil, substantially as described.

In testimony that we claim the foregoing as our own we affix our names in the presence of two witnesses.

FREDERICK BILLING.
WILLIAM EDWARD PARTRIDGE.

Witnesses:
THOMAS MARSTON,
GEORGE LESTER.